INVENTOR.
CHARLES L. HAYNES,
BY James M. Abbett
ATTY.

Patented Aug. 22, 1944

2,356,402

UNITED STATES PATENT OFFICE 2,356,402

TUBE CUTOFF TOOL

Charles L. Haynes, Alhambra, Calif., assignor to C. F. Broun & Co., Alhambra, Calif., a corporation of California Application January 14, 1943, Serial No. 472,418

3 Claims. (Cl. 30—106)

This invention relates to metal working tools, and particularly pertains to a tube cut-off tool.

In the maintenance and operation of various pieces of apparatus, such as tubular boilers, heat exchangers, condensers and the like, it is sometimes necessary to remove the tubes from the tube nest and in this operation it is necessary to cut off a tube at a point beyond the tube sheet or baffle plate. In performing this operation it is desirable that a cut-off tool be provided which is simple in construction, rugged in design, and may be quickly inserted into the tube and driven to sever the tube rapidly. It is the principal object of the present invention, therefor, to provide a tube cut-off tool which is of compact design, may be manipulated easily, and when inserted within a tube will quickly perform a cut-off operation.

The present invention contemplates the provision of a body structure adapted to rest against the end of a tube sheet or the like, said structure carrying a mandrel adapted to be inserted into a tube, the mandrel providing a support for a cut-off tool actuated under pressure as the mandrel is power driven, the structure also providing means for maintaining the cutting area free of chips.

The invention is illustrated by way of example in the accompanying drawing in which.

Figure 1:
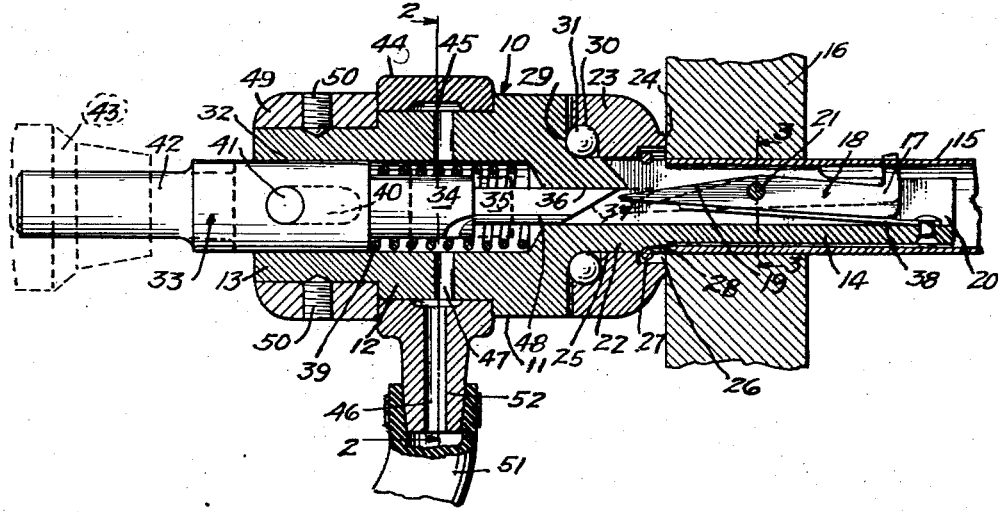
Figure 1 is a view in central longitudinal section showing the tool with which the present invention is concerned as positioned for a cutting off operation and indicating by dotted lines the position of the cut-off blade when actuated.
Figure 2:
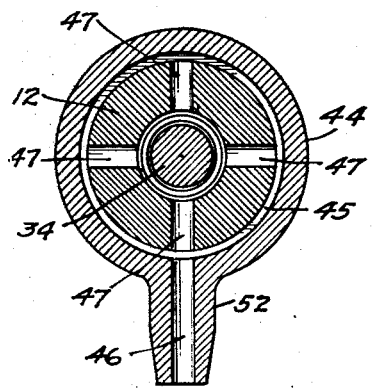
Fig. 2 is a view in transverse section through the structure as seen on the line 2—2 of Fig. 1 and indicates the blade actuating device.
Figure 3:
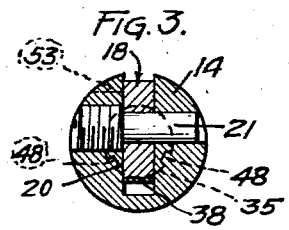
Fig. 3 is a view in transverse section through the tool as seen on the line 3—3 of Fig. 1 showing the mounting of the body member and the air duct structure.

Referring more particularly to the drawing, 10 indicates the body of a cut-off tool of the type with which the present invention is concerned. This structure is cylindrical, having a portion 11 of relatively large diameter, an adjacent portion 12 slightly smaller in diameter, and an end portion 13 of a further reduced diameter. The forward end of the body 10 is formed with a mandrel 14 which is circular in cross-section and is of a diameter to extend into a tube 15 which is to be cut off. The tube 15 has been expanded into a tube sheet 16. The length of the mandrel 14 is such as to project into the tube 15 a sufficient distance to carry the blade 17 of a cutter 18 beyond the area of the tube 15 embraced by the tube sheet 16. The cutter 18 is in the shape of a flat lever, at one end of which the blade 17 projects laterally, and the other end of which has a tapered face 19. The blade fits within a longitudinal slot 20 formed in the mandrel and is mounted upon a pivot pin 21 extending transversely of the slot and disposed at a suitable point intermediate the ends of the cutter 18 so that the cutter will act as a simple lever. A cylindrical portion 22 is formed as a part of the body 10 between the enlarged portion 11 and the mandrel section 14. This cylindrical portion is of greater diameter than the mandrel and of a lesser diameter than the body portion 11. Mounted upon this portion is a rotatable collar 23 which has a forwardly projected shoulder 24 resting against the tube sheet 16. The collar 23 has a central bore 25 through which the portion 22 of the mandrel extends. A counterbore 26 is formed at the forward end of said bore and receives a lock ring 27 which fits within a groove 28 and holds the collar 23 against displacement upon the portion of the body 22. The end face of the portion 11 of the body is formed with an annular ball race 29, and the contiguous face of the collar 23 is formed with a complementary ball race 30. Ball bearings 31 are positioned between these faces and thus provide an anti-friction bearing support for the body 10 which rotates with relation to the collar 23.

Formed centrally of the body 10 is a bore 32 within which a driving spindle 33 is reciprocably mounted. The driving spindle 33 has a cylindrical portion fitting the bore 32 and at one end is formed with a section 34 of reduced diameter at the end of which is formed a wedge pin 35. The wedge pin reciprocates within a relatively small bore 36 which is a continuation of the bore 32. This pin is formed with an inclined face 37 which engages the end 19 of the cutter 18 and reciprocates it. A flat leaf spring 38 is mounted within the slot 20 of the mandrel 14 and tends to resist the movement of the cutter 18 while holding the cutter blade 17 out of engagement with the tube. A helical spring 39 is mounted within the bore 32 and around the portions 34 and 35 of the spindle 33. This tends to hold the spindle 33 in its outermost or retracted position. Transverse slots 40 are formed in the opposite walls of the body portion 13 and receives a pin 41 extending transversely of the driving spindle and provides a positive driving connection between the spindle and the body 10 while permitting reciprocation of the spindle.

The spindle is formed with a reduced outer end 42 to receive the chuck 43 of a suitable prime mover, such as a portable motor. Mounted around the portion 12 of the body 10 is an annular yoke 44 formed with a relieved passageway 45 which extends around the portion 12 and communicates with an inflow duct 46. This yoke also communicates with radial passageways 47 formed in the body 10 and leading to the central bore 32. Thus, compressed air may be forced inwardly through the duct 46 into the annular passageway 45 and then to the central bore 32 through the passageways 47. Formed longitudinally of the wedge pin 35 are grooves 48 through which air is delivered to the cutting area of the mandrel 14. The member 44 is held in place by a collar 49 which fits upon the portion 13 of the body 10 and is held in position by set screws 50. It is to be understood that during operation the yoke 44 stands relatively still, and that the body 10 is driven to rotate within the yoke as the collar 23 bears against the tube sheet 16.

In operation of the present invention the structure is assembled as shown in the drawing. When a tube having the specified inside diameter and wall thickness is to be cut off, a tool of appropriate dimensions is selected, so that the mandrel 14 will fit properly within the tube and the cutter blade 17 will swing outwardly to cut a kerf through the tube wall. The driving spindle 33 is gripped by the chuck 43 of a driving mechanism and a conduit 51 mounted upon a nipple 52 of the yoke 44 is grasped so that the mandrel of the tool can be introduced into the end of the tube 15, after which pressure is applied to bring the face 24 of the collar 23 into engagement with the face of the tube sheet 16. As continued pressure is applied the frictional engagement of the face 24 of the collar with the tube sheet will tend to hold the collar against rotation while the body 10 and the spindle 33 continue to rotate. Pressure is then applied to the driving spindle 33. This will move the spindle inwardly and lengthwise of the bore 32 against the expansive action of the spring 39 and will force the wedge pin 35 so that its face 37 will engage the face of the portion 19 of the cutter 18 and tend to swing the opposite end of the cutter outwardly to force the blade into positive engagement with the wall of the tube 15. As this takes place the mandrel 14 and the blade are rotating around the axis of the spindle 33 and a kerf will be formed in the wall of the tube 15 and therethrough. As the blade 17 is forced outwardly incident to the swinging movement of the cutter 18 air under pressure is forced into the structure through the conduit 51 and through the duct 46 of the nipple 52, thereafter passing along the annular channel 45 to the radial passageways 47 and into the bore 32. This air then is forced along the longitudinal grooves 48 in the wedge pin 35 and from there will pass into the tube 15. Here it will blow the chips of metal produced by the blade 17 inwardly and keep the cutter free, so that when the wedge pin 35 is retracted the end of the cutter carrying the blade may swing downwardly into the groove 20 of the mandrel and to a fully retracted position so that the blade will not hang on the severed end of the tube and so that the entire cut-off tool may be removed from its operative position without difficulty. The member 14 is cut away, as indicated at 53, for chip clearance.

It will thus be seen that the cut-off tool here disclosed is simple in its construction and provides efficient means for rapidly severing tubes by an operation within the tube, and furthermore assuring that the tool may be conveniently removed from the tube when the operation has been completed.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. An internally operating tube cut-off tool, comprising a cylindrical body, an encircling yoke within which said cylindrical body is held for rotation and against longitudinal movement, a rotatable collar mounted on one end of said body and adapted to bear against a tube sheet, a mandrel formed as a continuation of the body and extending through said rotatable collar to project into a tube to be cut off, said mandrel being formed with a central longitudinal slot, a cutter lever positioned within said longitudinal slot and formed with a blade at one end, said lever being pivotally mounted, whereby the blade may swing laterally to and from cutting positions, a driving spindle mounted within the cylindrical body and having a positive rotatable driving connection therewith while being longitudinally reciprocable therein, and a wedge pin carried by said driving spindle adapted to engage the end of the cutting lever to swing the blade on said lever to a cutting position.

2. The structure of claim 1 including means tending to urge the cutting blade to its non-cutting position, and means tending to urge the wedge pin to a non-actuating position.

3. The structure of claim 1 including an air duct formed in the encircling member and communicating with the central passageway of the cylindrical body, and longitudinal passageways formed in the wedge pin and directing air into the cutting area of the tube.

CHARLES L. HAYNES.